United States Patent [19]
Luther et al.

[11] Patent Number: 6,059,855
[45] Date of Patent: May 9, 2000

[54] PROCESS FOR DECONTAMINATING SUSPENSIONS CONTAINING SILT, POLLUTANTS AND WATER

[75] Inventors: Günter Luther; Peter Wietstock, both of Geesthacht, Germany

[73] Assignee: GKSS-Forschungszentrum Geesthacht GmbH

[21] Appl. No.: 09/041,357

[22] Filed: Feb. 19, 1998

Related U.S. Application Data

[63] Continuation-in-part of application No. PCT/DE96/01479, Aug. 8, 1996.

[30] Foreign Application Priority Data

Aug. 16, 1995 [DE] Germany ............................ 195 29 998

[51] Int. Cl.[7] .................................................. C22B 43/00
[52] U.S. Cl. .............................. 75/670; 75/742; 210/774
[58] Field of Search ....................... 75/670, 742; 210/774

[56] References Cited

U.S. PATENT DOCUMENTS

| | | | |
|---|---|---|---|
| 5,300,137 | 4/1994 | Weyand et al. | 75/670 |
| 5,569,154 | 10/1996 | Navetta et al. | 75/670 |

*Primary Examiner*—Melvyn Andrews
*Attorney, Agent, or Firm*—Klaus J. Bach

[57] ABSTRACT

In a process for decontaminating suspensions containing silt, pollutants and water, particularly mercury and hydrocarbon pollutants, the suspensions are heated under pressure to boiling temperature, then passed through a throttling device wherein the pressure is reduced so that, by flashing, a three-phase mixture comprising steam, residual water and solids is formed which mixture is then superheated in a pipe reactor whereby the pollutants are enriched in the steam phase, the solids are then separated out of the mixture and the steam phase is condensed for collection of the pollutants with the condensate.

11 Claims, 1 Drawing Sheet

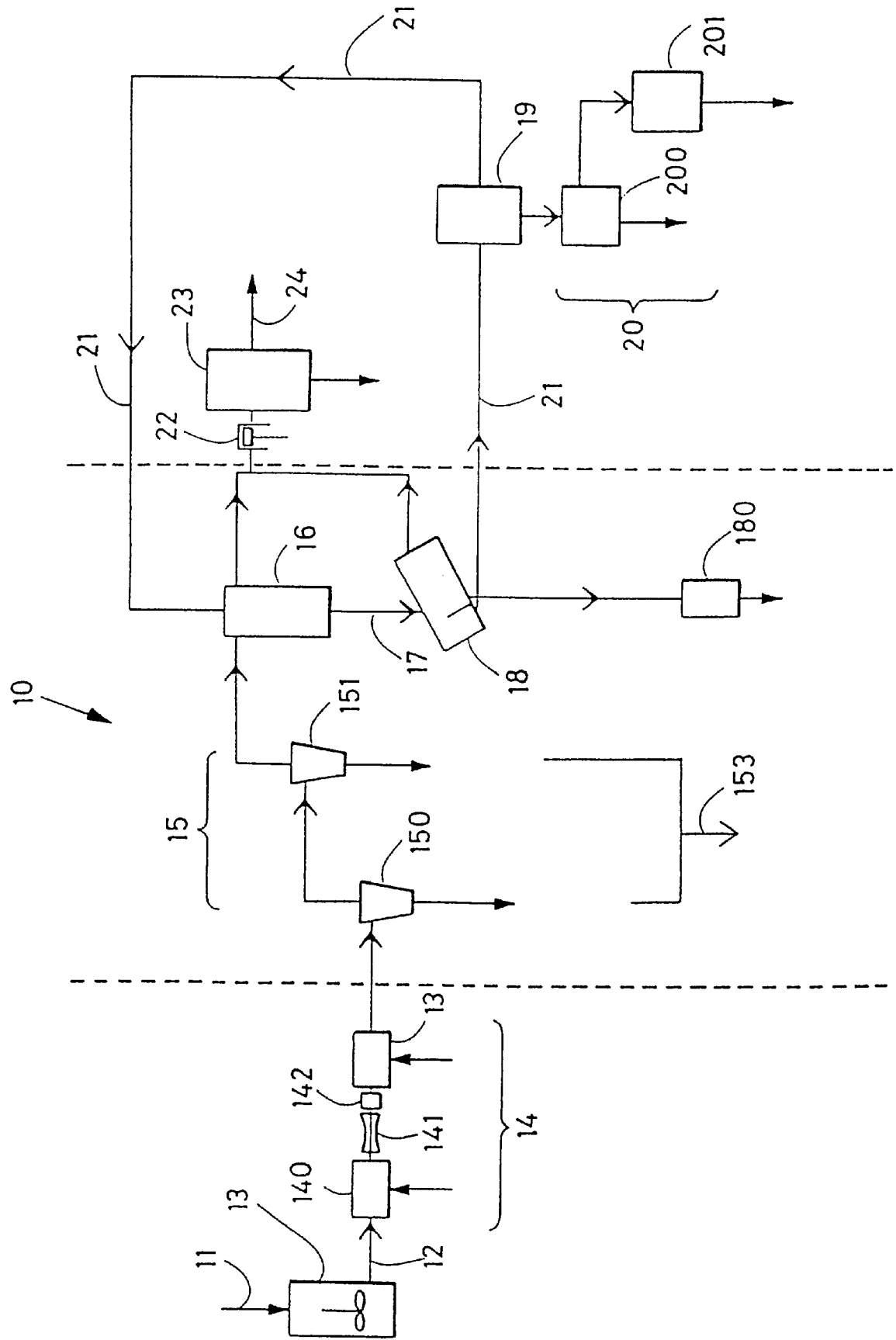

PROCESS FOR DECONTAMINATING SUSPENSIONS CONTAINING SILT, POLLUTANTS AND WATER

This is a continuation-in-part application of international application PCT/DE96/01479 filed Aug. 8, 1996 and claiming priority of German application No. 195 29 998.1 filed Aug. 16, 1995.

BACKGROUND OF THE INVENTION

The invention relates to a process for decontaminating suspensions containing silt pollutants and water, particularly mercury and/hydrocarbon-containing pollutants.

Pollutants, which can be vaporized at temperatures of up to 300° C. are generally driven out of the compound mixture to be decontaminated, such as contaminated silt, in rotary furnaces, in kilns or in a fluidized bed apparatus. Since silt mixtures are generally erosive, all the rotary parts of the known furnaces or apparatus are subject to high wear and require extensive maintenance. In addition, rotary furnaces and fluidized bed apparatus require a uniform generally pelletized material mixture. To provide such a mixture, it is generally necessary to pre-dry the aqueous fractions obtained during the mechanical cleaning procedure. Often, additionally, a vacuum of 0.1 bar or lower pressures are utilized to facilitate the removal of the pollutants. Because of the erosive effects of the material mixture or rather, the silt mixture, the known rotary furnaces and fluidized bed or other apparatus, which include rotary parts and seals, encounter substantial seal problems and, consequently, service problems. For safety reasons the relatively high vacuum utilized with such equipment requires that the equipment is well sealed, but yet the equipment includes large volume apparatus such as rotary furnaces. A collapse of the vacuum generally requires the apparatus to be shut down, repaired and restarted which leads to long downtimes and complex restart problems.

It is therefore the object of the present invention to provide a process for decontaminating suspensions containing silt, pollutants and water wherein the material mixture does not need to be predried and pelletized and furnaces including rotary equipment are also not needed so that the process according to the invention can be performed easily and effectively; it should also be suitable for the cleanup of large volume mixtures or suspensions so that the process can be effectively used for the decontamination of contaminated soils, that is for the protection of the environment.

SUMMARY OF THE INVENTION

In a process for decontaminating suspensions containing silt, pollutants and water, particularly mercury and hydrocarbon pollutants, the suspensions are heated under pressure to boiling temperature, then passed through a throttling device wherein the pressure is reduced so that, by flashing, a three-phase mixture comprising steam, residual water and solids is formed which mixture is then superheated in a pipe reactor whereby the pollutants are enriched in the steam phase, the solids are then separated out of the mixture and the steam phase is condensed for collection of the pollutants with the condensate.

It is an important advantage of the process according to the invention that even highly contaminated mixtures and suspensions, particularly highly contaminated soils can be cleaned up effectively and in large volumes. With the process according to the invention, for example, a suspension which, before the decontamination procedure contained 500 mg/kg mercury (TS), contained only a small residual content of 1 m/kg (TS) mercury after having been subjected to the process according to the invention. The process can advantageously be performed in such a way that the components needed for performing the process have no rotating parts which are sensitive to erosion, and calcination of the equipment surfaces by partial drying out and heating is unlikely to take place. Since the equipment uses no rotating parts maintenance and servicing requirements of the equipment and apparatus employed in connection with the method according to the invention is therefore extremely low. Consequently, the process according to the invention is extremely easy to perform.

In a preferred embodiment of the invention, the density of the suspension is adjusted to a value $\geq 1.2$ kg/l and the suspension is heated under a pressure of 12–30 bar. The suspension can be heated, for example, by blowing steam directly into the suspension, such that the suspension is pre-heated to 100° C. In this way, the suspension becomes flowable and can be supplied to a pipe reactor without special transport means.

In the pipe reactor, additional energy may be added to the suspension by the injection of superheated steam and/or by the combustion of hydrogen and oxygen and/or methane and oxygen in order to form a three-phase mixture including a superheated vapor phase.

Additional oxygen may be admitted to the reactor in a non-stoichiometric ratio for the initiation of hydrogenating or oxidizing reactions of the pollutants in the suspension or, respectively, in the three-phase mixture.

It is also advantageous if the three-phase mixture is treated in the reactor under a reactor internal pressure of 0.7–0.9 bar. This low pressure is used only for safety purposes so that, should leaks occur in parts of the system, ambient air enters the system, but no pollutants such as mercury are released to the environment.

In an advantageous embodiment of the method according to the invention, the mixture of vaporous pollutants and solids leaving the pipe reactor are separated from each other in a cyclone or any other type of solids-separator.

The condenser used in the method according to the invention for the condensation of the vaporous pollutants will generally not be capable of condensing absolutely all the vaporous or gaseous pollutants. There will always be a non-condensable portion in the gaseous pollutants. These non-condesable gases are subjected to a gas cleaning process preferably in a gas cleaning stage which utilizes cleaning equipment known in the art.

The pollutants are removed during the gas cleaning process, however, preferably by means of activated carbon, that is, the non-condensable rest gases are adsorbed at the contact surfaces of the activated carbon.

The water required for the condensation of the pollutants in the condenser is purified by way of a membrane separation process and is then reused for the condensation of the pollutants, that is, the condensation water is recirculated at least partially in a process cycle through the condenser so that only a relatively small amount of fesh water is needed.

An embodiment of the invention will be described on the basis of a schematic drawing.

BRIEF DESCRIPTION OF THE DRAWINGS

The sole FIGURE shows a block diagram of a plant for performing the process according to the invention, the plant being divided into the areas processing, separation, purification which are shown separated by dashed vertical lines indicating the process steps side by side from the left to the right in the order as performed.

Before the method steps are described in detail, the plant 10 for the decontamination of silt, pollutants and water-containing suspensions 12 will be described on the basis of the single FIGURE. The mixture 11 to be decontaminated which may be, for example, mercury-contaminated soil, is supplied to a mixing container 13 where it is maintained in suspension while it is preheated, at a pressure of 10–20 bar, to a temperature of up to about 100° C. by the direct addition of steam. The suspension 12 which, after treatment in the mixing container 13 has a partially non-Newton flow behavior, is supplied to a pipe heater 14.

The pipe reactor 14 comprises three parts, that is, an injector 140, a subsequent throttle 141 and a superheating section 142 and finally a steam injector 143. The injector 140 is operated by superheated steam which is admitted in order to further heat the suspension 12 almost to the boiling point. Then the suspension passes through a throttle 141 and subsequently through a superheater section 142 and finally through a vapor injector 143.

The pipe reactor 14 includes displacement elements which are not shown in the FIGURE but which provide for a sufficient speed of the suspension to prevent the collection of parts of the suspension in the pipe reactor when the transport temperature of the suspension falls below a certain point and which, at the same time, provide for sufficient turbulence in the reactor area such that the internal walls of the pipe reactor remain free from deposits.

Leaving the injector 140, the suspension 12 consists of saturated steam and wet silt. Upon passing through the throttle 141, the pressure is spontaneously reduced to about 1.5 bar corresponding to the boiling pressure equilibrium. In the subsequent steam reactor 143, which is the actual pipe reactor section, the suspension is superheated to about 300° C. by an indirect pipe wall heater. However, the energy for the superheating may also be obtained by the combustion of hydrogen and oxygen and/or methane and oxygen. Energy may also be supplied by the injection of superheated steam. At the end of the pipe reactor 14, the contaminants to be removed from the suspension 12 are present in a superheated vapor phase.

In the actual vapor reactor 143 at the end of the pipe reactor 14, additional steam is added which is necessary to adapt the capacity range of of a solids separator 15 disposed downstream of the pipe reactor 14 to the material flow supplied thereto.

The solids separator 15 (cyclone) may include for example, first and second cascade stages 150, 157. In the solids separator, the solids are separated and deposited, for example, as a decontaminated mixture 153, for example decontaminated soil, which is collected and removed for use elsewhere. A steam-vapor phase highly enriched with pollutants exits the solids separator and enters a condenser 16 where it is condensed. The condensate 17 is collected in a settlement container 18. There, all non-soluble pollutants, such as mercury, settle out of the condensate and are collected in a container 180 for disposition elsewhere.

The circulating water 21 required for the operation of the condenser 16 flows through an intercooler 19 and then through a membrane reconditioning apparatus 20, which, in the embodiment shown in the FIGURE, consists of an ultra-centrifuge 200 and a reverse osmosis filter apparatus 201. Then it is again returned to the condenser 16.

A vacuum pump 22 including a buffer tank (not shown) connected to the condenser 16 provides for a suitable vacuum in the system which is for example, 0.8 bar, and which removes the gases from the condenser 16.

The gas outlet 24 from the condenser 16 or the vacuum pump 22 connected to the condenser 16 is disposed downstream of a discharge gas cleaning apparatus 23. The cleaning apparatus 23 may consist of a washer, a catalytic converter, or an adsorber, the gases being then discharged to the atmosphere through the outlet 24 after being cleaned up in the cleaning apparatus 23. If the discharge gases should still include toxic hydrocarbons, an $H_2/O_2$ burner could be utilized as an after burner for destroying such toxic gases.

The method for decontaminating silt, pollutants and water-containing suspensions 12 particularly mercury and/or hydrocarbons containing pollutants is in accordance with the arrangement 10 as follows:

The suspension 12 is heated in the mixing container 13 under a pressure of 12–20 bar to almost boiling temperature. In the subsequent pipe reactor, the suspension 12 is further heated in the injection chamber 140 up to its boiling temperature. Then the suspension 12 passes through the throttle 141, wherein its pressure is reduced and the steam flashing thereby from the suspension, the remaining water and the solids form a three-phase mixture which his supplied to a superheater section 142, which forms the central part of the pipe reactor 14. There, the mixture is superheated by further addition of energy to such a degree that the pollutants become enriched in the superheated steam phase which is collected after removal of the solids.

Tests with the method described herein, that is with the plant 10, have shown that the mercury containing silt fraction can be decontaminated by the addition of water and subsequent heating to 300° C. such that an original content of about 500 mg/kg mercury is lowered to an residual content of 1 mg/kg mercury. The results were obtained in a laboratory reactor similar to the plant described herein. The reaction chamber used therein had a volume of 6.87 l. For an analytical determination, the mercury contained in the sample was amalgamated quantitatively by chemosorption to a gold net and was subsequently desorbed by heating for an analysis and then conducted, by way of an inert gas stream, to a mercury measuring apparatus for analysis.

What is claimed is:

1. A process for decontaminating suspensions containing silt pollutants and water, said process comprising the steps of:

heating the suspension under pressure to boiling temperature, passing the suspension into a pipe reactor through a throttling device thereby reducing its pressure so as to cause flashing whereby a three-phase mixture comprising steam, residual water and solids is formed in said pipe reactor, superheating the mixture in said pipe reactor by adding additional energy whereby the pollutants are enriched in the steam phase of said three-phase mixture, separating the solids from said three phase mixture, and condensing the steam phase for collection of the pollutants with the condensate.

2. A process according to claim 1, wherein said suspension has a density of ≧1.2 kg/l, the suspension being heated at a pressure of 12–10 bar.

3. A process according to claim 1, wherein said energy is added in said pipe reactor by the injection of superheated steam.

4. A process according to claim 1, wherein said energy is added in said pipe reactor by combustion of at least one of hydrogen and methane with oxygen.

5. A process according to claim 1, wherein hydrogen is added to the suspension in the pipe reactor in a non-stoichiometric ratio for the initiation of hydrogenating or oxidizing reactions involving the pollutants.

6. A process according to claim 1, wherein said suspension is throttled down to a pressure of 0.7–1.0 bar.

7. A process according to claim 1, wherein the three-phase mixture is supplied from the pipe reactor to a solids separator in which the solids are removed from the mixture.

8. A process according to claim 1, wherein gaseous non-condensable components are submitted to a gas cleaning process in which pollutants are extracted.

9. A process according to claim 8, wherein the pollutants extracted on the gas cleaning process are adsorbed on adsorber surfaces.

10. A process according to claim 9, wherein said adsorber surfaces are activated carbon surfaces.

11. A process according to claim 1, wherein cooling water required for the condensation of the pollutants is cleaned by at least one membrane separation process step and is at least partially recycled for the condensation of the pollutants.

* * * * *